US011671558B2

(12) United States Patent
Favors

(10) Patent No.: US 11,671,558 B2
(45) Date of Patent: Jun. 6, 2023

(54) FRAME ASSEMBLY

(71) Applicant: Doniel Favors, Santa Clara, CA (US)

(72) Inventor: Doniel Favors, Santa Clara, CA (US)

( * ) Notice: Subject to any disclaimer, the term of this patent is extended or adjusted under 35 U.S.C. 154(b) by 2 days.

(21) Appl. No.: 17/412,452

(22) Filed: Aug. 26, 2021

(65) Prior Publication Data

US 2023/0060401 A1 Mar. 2, 2023

(51) Int. Cl.
*G03B 15/03* (2021.01)
*H04N 5/64* (2006.01)
*F21V 21/00* (2006.01)
*B44C 1/18* (2006.01)
*G06F 1/16* (2006.01)

(52) U.S. Cl.
CPC ............... *H04N 5/64* (2013.01); *B44C 1/18* (2013.01); *F21V 21/00* (2013.01); *G06F 1/1607* (2013.01)

(58) Field of Classification Search
None
See application file for complete search history.

(56) References Cited

U.S. PATENT DOCUMENTS

| 6,550,172 | B2 | 4/2003 | Korpal |
| 7,808,563 | B2 | 10/2010 | Sanchez |
| 8,134,651 | B1 | 3/2012 | Reid |
| D674,200 | S | 1/2013 | Carrasco |
| 2006/0000135 | A1 | 1/2006 | Yoon |
| 2007/0046841 | A1 | 3/2007 | Jacobsmeyer |
| 2013/0194775 | A1* | 8/2013 | Geddes ............... F21V 21/30 362/225 |
| 2015/0274407 | A1 | 10/2015 | Wright |
| 2015/0276187 | A1* | 10/2015 | Shoemake ............ G06F 1/1626 362/235 |

FOREIGN PATENT DOCUMENTS

WO WO2005089323 9/2005

* cited by examiner

*Primary Examiner* — Elmito Breval

(57) ABSTRACT

An ornamental frame assembly for enhancing the ornamental appearance of a flat screen display includes a frame that has a plurality of intersecting members such that the frame has a rectangular shape to conform to a flat screen display. Each of the intersecting members comprises a first portion that is oriented at an angle with a second portion to accommodate an outer edge of the flat screen display. A lens is attached to the frame such that the lens extends around a full perimeter of the frame. A plurality of light emitters is each positioned in the frame. Each of the light emitters is positioned behind the lens to emit light through the lens.

7 Claims, 5 Drawing Sheets

FRAME ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to frame devices and more particularly pertains to a new frame device for enhancing the ornamental appearance of a flat screen display. The device includes a rectangular frame that is positionable on a flat screen display and a lens that is integrated into the frame. Additionally, a plurality of light emitters is each integrated into the frame to emit light outwardly through the lens.

(2) Description of Related Art Including Information Disclosed Under 37 CFR 1.97 and 1.98

The prior art relates to frame devices including a variety of modular frames that are attachable to a display screen. The prior art discloses a decorative frame which includes a fabric sleeve for engaging corners of a display screen. The prior art discloses a frame for positioning on a display screen that is mounted to a wall. The prior art discloses an ornamental frame that is positionable around a flat screen display and which includes apertures to facilitate access to controls on the flat screen display.

BRIEF SUMMARY OF THE INVENTION

An embodiment of the disclosure meets the needs presented above by generally comprising a frame that has a plurality of intersecting members such that the frame has a rectangular shape to conform to a flat screen display. Each of the intersecting members comprises a first portion that is oriented at an angle with a second portion to accommodate an outer edge of the flat screen display. A lens is attached to the frame such that the lens extends around a full perimeter of the frame. A plurality of light emitters is each positioned in the frame. Each of the light emitters is positioned behind the lens to emit light through the lens.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
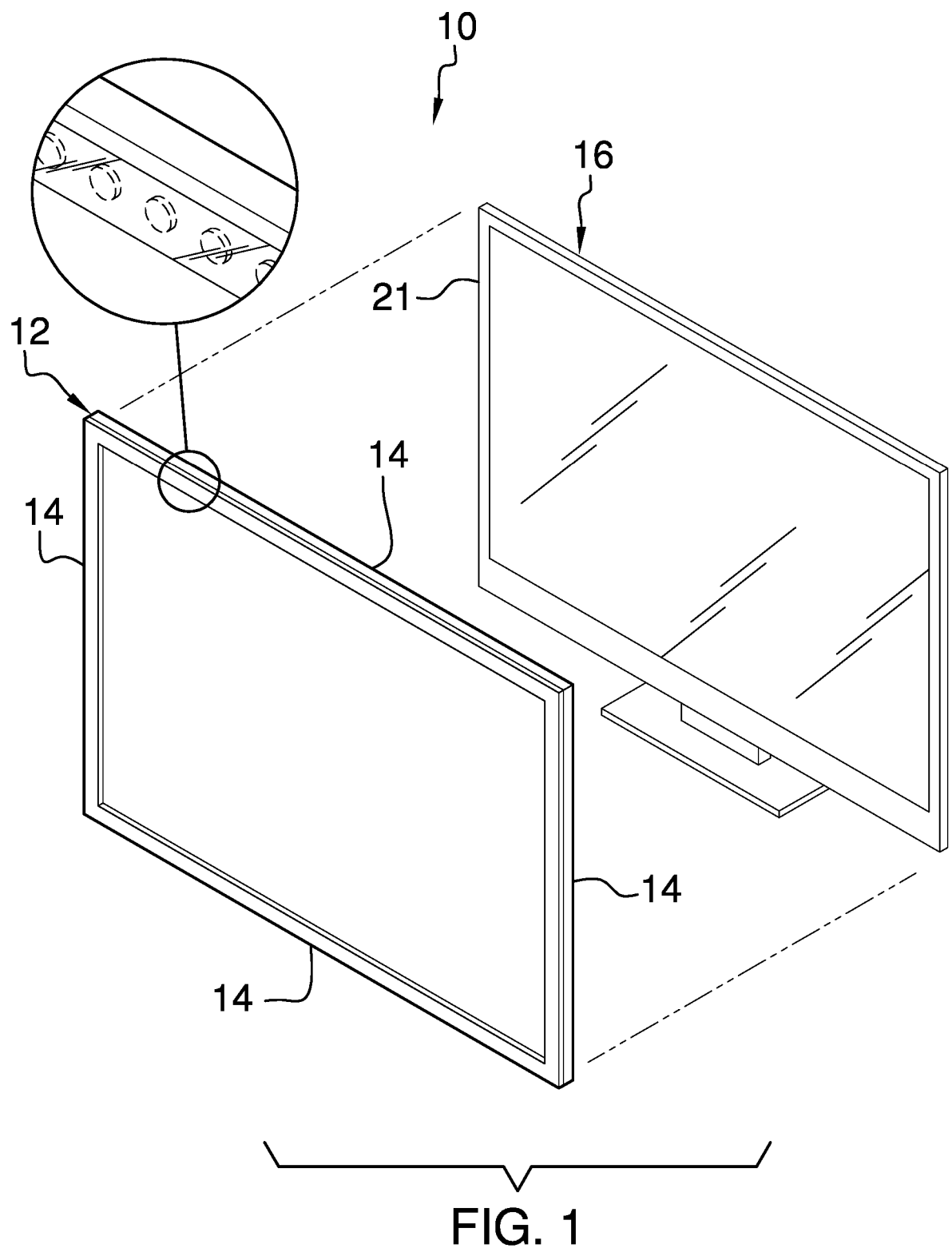
FIG. 1 is an exploded perspective view of an ornamental frame assembly according to an embodiment of the disclosure.
Figure 2:
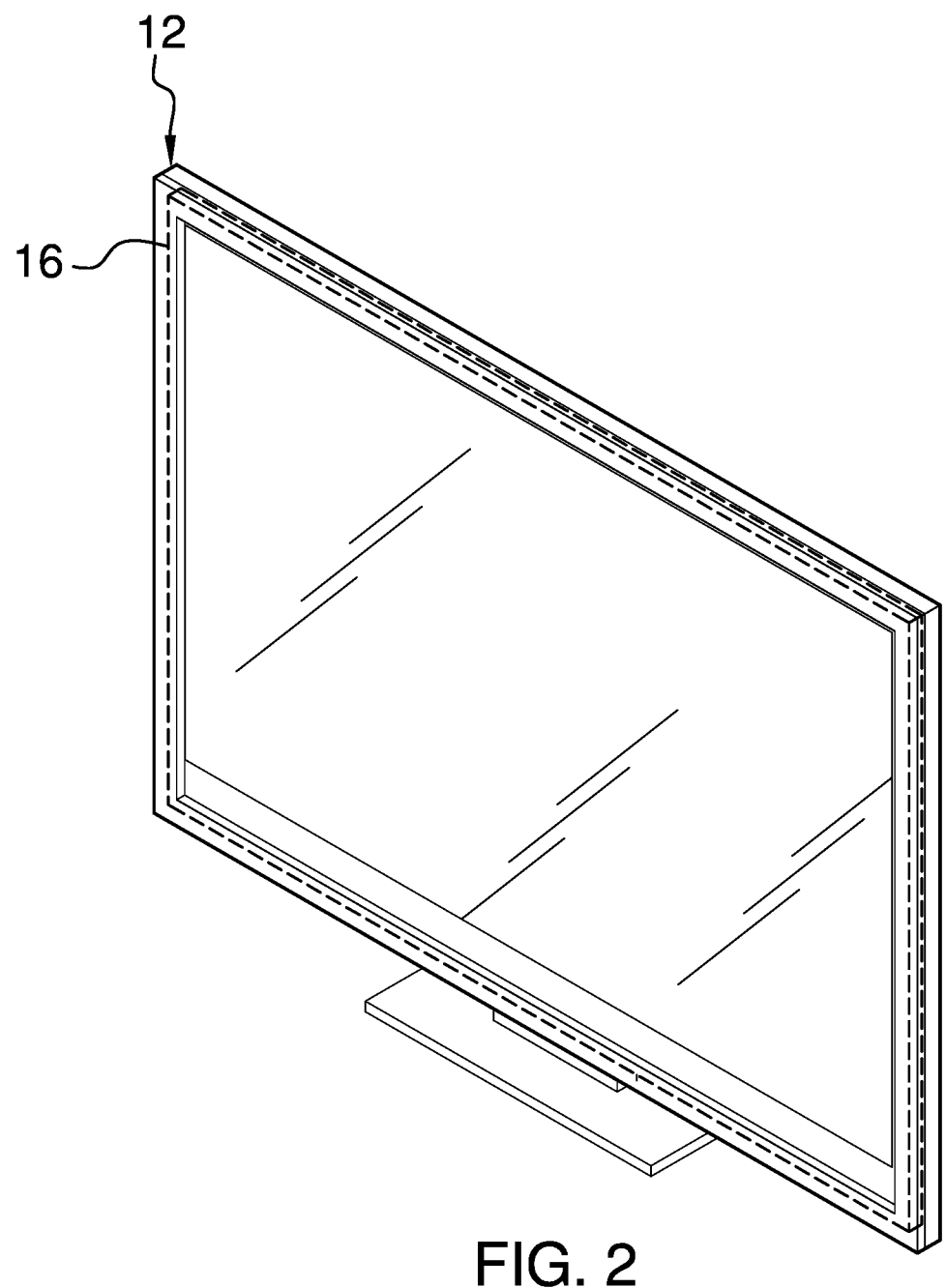
FIG. 2 is a phantom in-use view of an embodiment of the disclosure.
Figure 3:
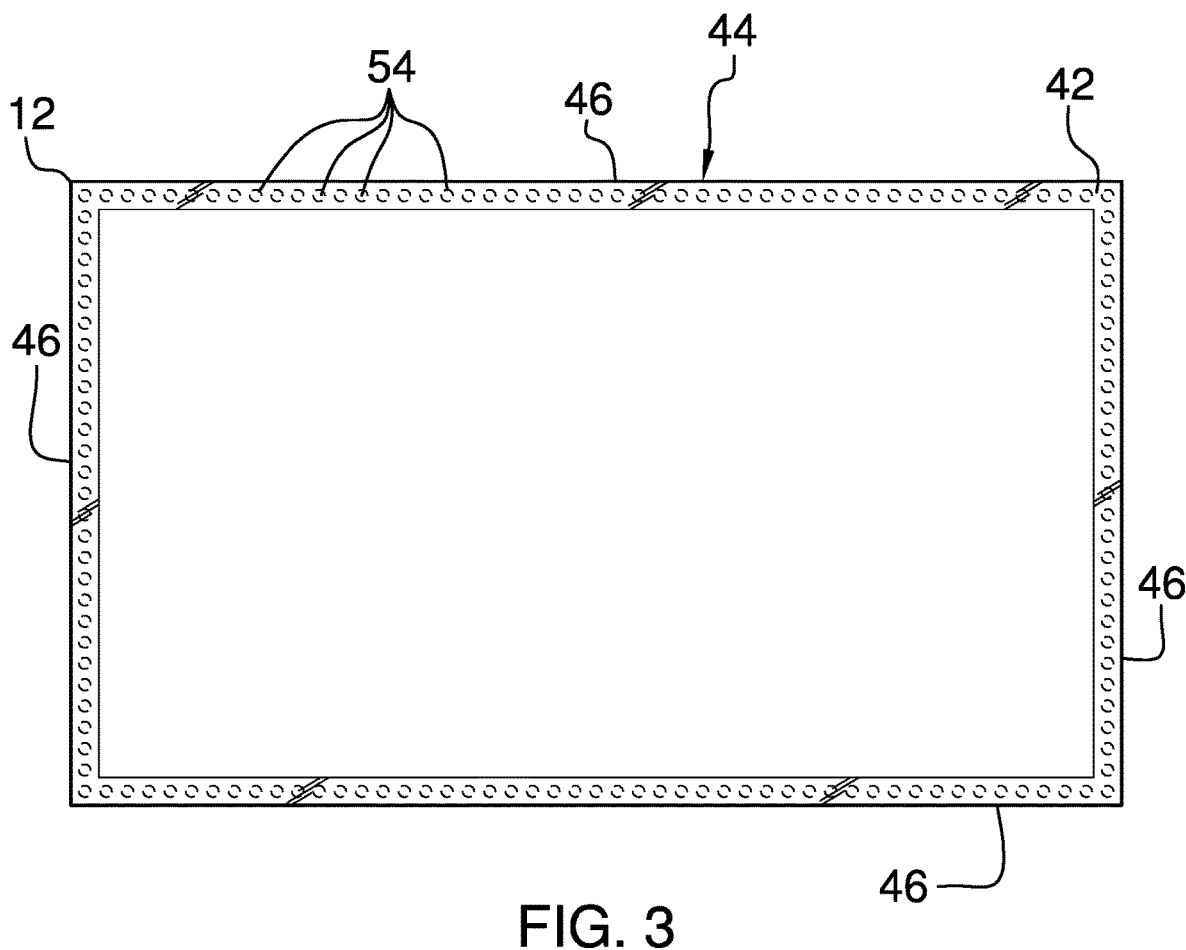
FIG. 3 is a front view of an embodiment of the disclosure.
Figure 4:
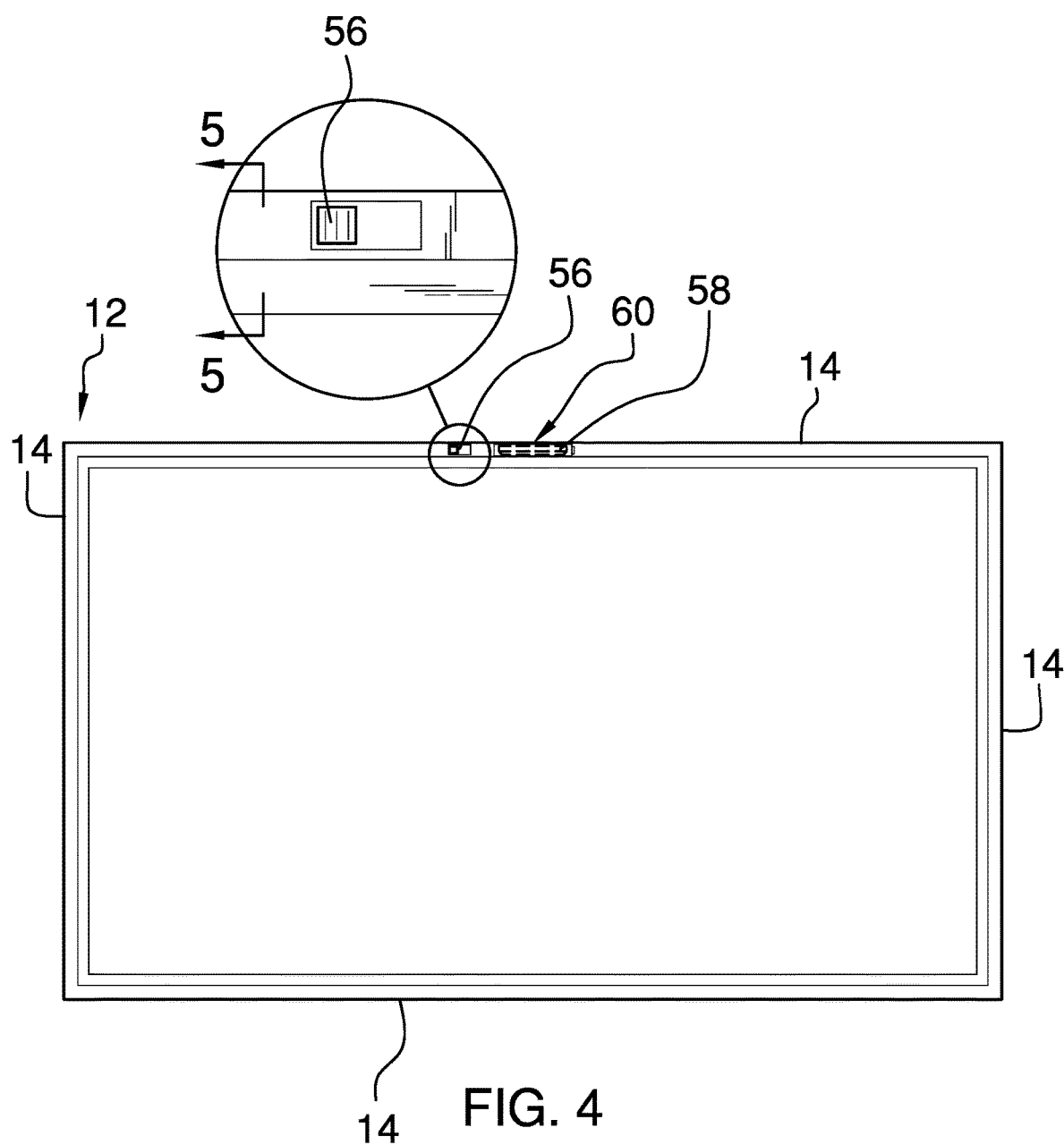
FIG. 4 is a back view of an embodiment of the disclosure.
Figure 5:
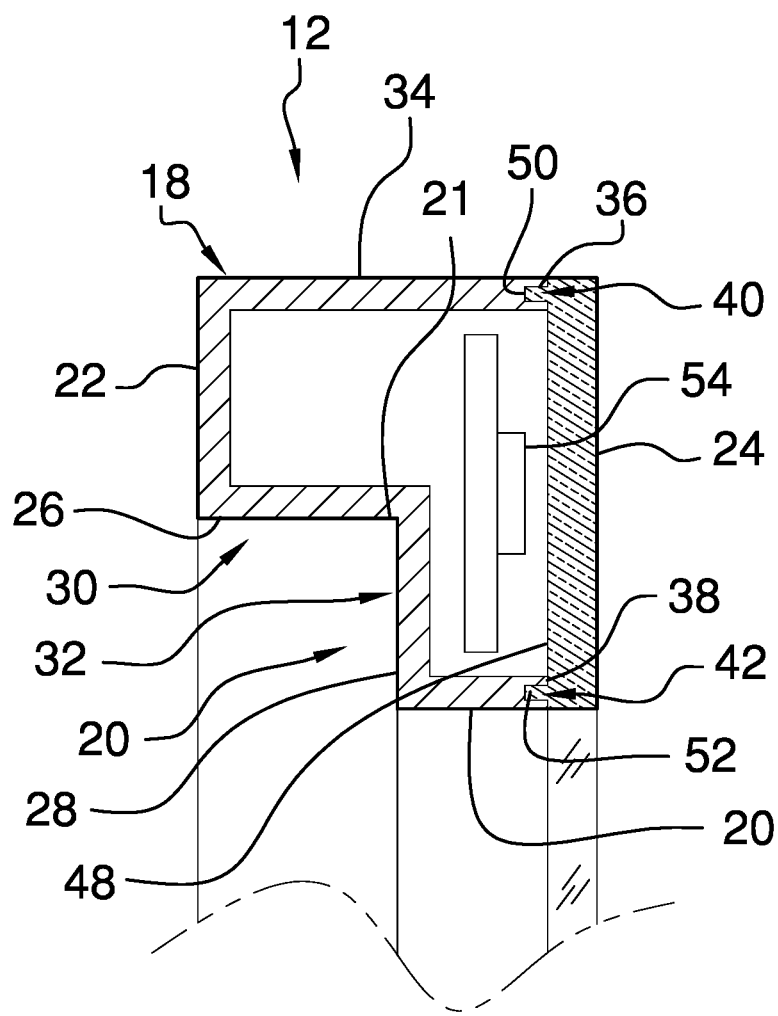
FIG. 5 is a cross sectional view taken along line 5-5 of FIG. 4 of an embodiment of the disclosure.

With reference now to the drawings, and in particular to FIGS. 1 through 5 thereof, a new frame device embodying the principles and concepts of an embodiment of the disclosure and generally designated by the reference numeral 10 will be described.

As best illustrated in FIGS. 1 through 5, the ornamental frame assembly 10 generally comprises a frame 12 that has a plurality of intersecting members 14 such that the frame 12 has a rectangular shape. In this way the frame 12 can conform to a flat screen display 16. The flat screen display 16 may comprise a flat screen television, a flat screen computer monitor or any other type of electronic display. Each of the intersecting members 14 comprises a first portion 18 that is oriented at an angle with a second portion 20 such that each of the intersecting members 14 can accommodate an outer edge 21 of the flat screen display 16.

Each of the intersecting members 14 has a rear wall 22 and a lower wall 24, and each of the intersecting members 14 has a first wall 26 and a second wall 28 that is oriented at a right angle with respect to each other. The first wall 26 lies on a plane that is oriented parallel with the lower wall 24 and the second wall 28 lies on a plane that is oriented parallel with the rear wall 22. The first wall 26 defines a lower threshold 30 of the first portion 18 and the second wall 28 defines a rear threshold 32 of the second portion 20. Each of the intersecting members 14 has a top wall 34 extending forwardly from the rear wall 22 and the top wall 34 is spaced from the lower wall 24. Furthermore, the top wall 34 lies on a plane that is oriented parallel to the lower wall 24.

The top wall 34 has a distal edge 36 with respect to the rear wall 22 and the lower wall 24 has a distal edge 38 with respect to the second wall 28. The distal edge 36 of the top wall 34 has a first groove 40 extending inwardly on the distal edge 36 of the top wall 34. Moreover, the first groove 40 extends along a full length of the top wall 34. The distal edge 38 of the lower wall 24 has a second groove 42 extending inwardly on the distal edge 38 of the lower wall 24. Additionally, the second groove 42 extends along a full length of the lower wall 24.

A lens 44 is included that has a plurality of intersecting arms 46 such that the lens 44 has a rectangular shape. Each of the intersecting arms 46 is attached to a respective one of the intersecting members 14 of the frame 12 such that the lens 44 extends around a full perimeter of the frame 12. The lens 44 is comprised of a translucent material to pass light through the lens 44. Each of the intersecting arms 46 has a rear surface 48 and the rear surface 48 of each of the arms 46 has a first tab 50 extending away from the rear surface 48. The first tab 50 extends along a full perimeter of the lens 44. The rear surface 48 of each of the arms 46 has a second tab 52 extending away from the rear surface 48 and the second tab 52 extends along a full perimeter of the lens 44. The first tab 50 on each of the arms 46 engages the first groove 40 in the distal edge 36 of the top wall 34 associated with each of the intersecting members 14 of the frame 12.

Additionally, the second tab 52 on each of the arms 46 engaging the second groove 42 in the distal edge 38 of the lower wall 24 associated with each of the intersecting members 14 of the frame 12.

A plurality of light emitters 54 is each positioned in the frame 12. Each of the light emitters 54 is positioned behind the lens 44 to emit light through the lens 44. The plurality of light emitters 54 is spaced apart from each other and is distributed around a full perimeter of the frame 12. Additionally, the plurality of light emitters 54 is in electrical communication with each other. Each of the light emitters 54 may comprise a light emitting diode or other similar type of electronic light emitter.

A switch 56 is slidably integrated into the rear wall 22 of a respective one of the intersecting members 14 of the frame 12 and the switch 56 is electrically coupled to the plurality of light emitters 54. The switch 56 is positionable in an on position for turning the plurality of light emitters 54 on and the switch 56 is positionable in an off position for turning the plurality of light emitters 54 off. A power supply 58 is integrated into a respective one of the intersecting members 14 of the frame 12. The power supply 58 is electrically coupled to the switch 56 and the power supply 58 comprises at least one battery 60.

In use, the frame 12 is positioned on the flat screen display 16 to enhance the ornamental appearance of the flat screen display 16. The switch 56 can be moved into the on position to turn on the plurality of light emitters 54. In this way the light emitters 54 emit light outwardly through the lens 44 for further enhancing the ornamental appearance of the flat screen display 16. The switch 56 can be moved into the off position to turn off the plurality of light emitters 54. Thus, the ornamental appearance of the flat screen display 16 can be enhanced with only the presence of the frame 12 or with the presence of the frame 12 in conjunction with the light emitted through the lens 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An ornamental frame assembly for positioning on a flat screen display to enhance the ornamental appearance of the flat screen display, said assembly comprising:

a frame having a plurality of intersecting members such that said frame has a rectangular shape wherein said frame is configured to conform to a flat screen display, each of said intersecting members comprising a first portion being oriented at an angle with a second portion wherein each of said intersecting members is configured to accommodate an outer edge of the flat screen display;

a lens having a plurality of intersecting arms such that said lens has a rectangular shape, each of said intersecting arms being attached to a respective one of said intersecting members of said frame such that said lens extends around a full perimeter of said frame, said lens being comprised of a translucent material Wherein said lens is configured to pass light through said lens;

a plurality of light emitters, each of said light emitters being positioned in said frame, each of said light emitters being positioned behind said lens wherein each of said light emitters is configured to emit light through said lens, said plurality of light emitters being spaced apart from each other and being distributed around a full perimeter of said frame, said plurality of light emitters being in electrical communication with each other; and wherein each of said intersecting members has a rear wall and a lower wall, each of said intersecting members having a first wall and a second wall being oriented at a right angle with respect to each other, said first wall lying on a plane being oriented parallel with said lower wall, said second wall lying on a plane being oriented parallel with said rear wall, said first wall defining a lower threshold of said first portion, said second wall defining a rear threshold of said second portion, each of said intersecting members having a top wall extending forwardly from said rear wall, said top wall being spaced from said lower wall, said top wall lying on a plane being oriented parallel to said lower wall.

2. The assembly according to claim 1, wherein:

said top wall has a distal edge with respect to said rear wall, said distal edge of said top wall having a first groove extending inwardly on said distal edge of said top wall, said first groove extending along a full length of said top wall; and said lower wall has a distal edge with respect to said second wall, said distal edge of said lower wall having a second groove extending inwardly on said distal edge of said lower wall, said second groove extending along a full length of said lower wall.

3. The assembly according to claim 2, wherein each of said intersecting arms has a rear surface, said rear surface of each of said arms having a first tab extending away from said rear surface, said first tab extending along a full perimeter of said lens, said first tab on each of said arms engaging said first groove in said distal edge of said top wall associated with each of said intersecting members of said frame.

4. The assembly according to claim 3, wherein said rear surface of each of said arms has a second tab extending away from said rear surface, said second tab extending along a full perimeter of said lens, said second tab on each of said arms engaging said second groove in said distal edge of said lower wall associated with each of said intersecting members of said frame.

5. The assembly according to claim 1, further comprising:
a switch being slidably integrated into said rear wall of a respective one of said intersecting members of said frame, said switch being electrically coupled to said plurality of light emitters, said switch being positionable in an on position for turning said plurality of light emitters on, said switch being positionable in an off position for turning said plurality of light emitters off; and
a power supply being integrated into a respective one of said intersecting members of said frame, said power supply being electrically coupled to said switch, said power supply comprising at least one battery.

6. An ornamental frame assembly for positioning on a flat screen display to enhance the ornamental appearance of the flat screen display, said assembly comprising:
a frame having a plurality of intersecting members such that said frame has a rectangular shape wherein said frame is configured to conform to a flat screen display, each of said intersecting members comprising a first portion being oriented at an angle with a second portion wherein each of said intersecting members is configured to accommodate an outer edge of the flat screen display, each of said intersecting members having a rear wall and a lower wall, each of said intersecting members having a first wall and a second wall being oriented at a right angle with respect to each other, said first wall lying on a plane being oriented parallel with said lower wall, said second wall lying on a plane being oriented parallel with said rear wall, said first wall defining a lower threshold of said first portion, said second wall defining a rear threshold of said second portion, each of said intersecting members having a top wall extending for from said rear wall, said top wall being spaced from said lower wall, said top wall lying on a plane being oriented parallel to said lower wall, said top wall having a distal edge with respect to said rear wall, said lower wall having a distal edge with respect to said second wall, said distal edge of said top wall having a first groove extending inwardly on said distal edge of said top wall, said first groove extending along a full length of said top wall, said distal edge of said lower wall having a second groove extending inwardly on said distal edge of said lower wall, said second groove extending along a full length of said lower wall;
a lens having a plurality of intersecting arms such that said lens has a rectangular shape, each of said intersecting arms being attached to a respective one of said intersecting members of said frame such that said lens extends around a full perimeter of said frame, said lens being comprised of a translucent material wherein said lens is configured to pass light through said lens, each of said intersecting arms having a rear surface, said rear surface of each of said arms having a first tab extending away from said rear surface, said first tab extending along a full perimeter of said lens, said rear surface of each of said arms having a second tab extending away from said rear surface, said second tab extending along a full perimeter of said lens, said first tab on each of said arms engaging said first groove in said distal edge of said top wall associated with each of said intersecting members of said frame, said second tab on each of said arms engaging said second groove in said distal edge of said lower wall associated with each of said intersecting members of said frame;
a plurality of light emitters, each of said light emitters being positioned in said frame, each of said light emitters being positioned behind said lens wherein each of said light emitters is configured to emit light through said lens, said plurality of light emitters being spaced apart from each other and being distributed around a full perimeter of said frame, said plurality of light emitters being in electrical communication with each other;
a switch being slidably integrated into said rear wall of a respective one of said intersecting members of said frame, said switch being electrically coupled to said plurality of light emitters, said switch being positionable in an on position for turning said plurality of light emitters on, said switch being positionable in an off position for turning said plurality of light emitters off; and
a power supply being integrated into a respective one of said intersecting members of said frame, said power supply being electrically coupled to said switch, said power supply comprising at least one battery.

7. An ornamental frame system for positioning on a flat screen display to enhance the ornamental appearance of the flat screen display, said system comprising:
a flat screen display having an outer edge;
a frame having a plurality of intersecting members such that said frame has a rectangular shape to conform to said flat screen display, each of said intersecting members comprising a first portion being oriented at an angle with a second portion to accommodate said outer edge of said flat screen display, each of said intersecting members having a rear wall and a lower wall, each of said intersecting members having a first wall and a second wall being oriented at a right angle with respect to each other, said first wall lying on a plane being oriented parallel with said lower wall, said second wall lying on a plane being oriented parallel with said rear wall, said first wall defining a lower threshold of said first portion, said second wall defining a rear threshold of said second portion, each of said intersecting members having a top wall extending forwardly from said rear wall, said top wall being spaced from said lower wall, said top wall lying on a plane being oriented parallel to said lower wall, said top wall having a distal edge with respect to said rear wall, said lower wall having a distal edge with respect to said second wall, said distal edge of said top wall having a first groove extending inwardly on said distal edge of said top wall, said first groove extending along a full length of said top wall, said distal edge of said lower wall having a second groove extending inwardly on said distal edge of said lower wall, said second groove extending along a full length of said lower wall;

a lens having a plurality of intersecting arms such that said lens has a rectangular shape, each of said intersecting arms being attached to a respective one of said intersecting members of said frame such that said lens extends around a full perimeter of said frame, said lens being comprised of a translucent material wherein said lens is configured to pass light through said lens, each of said intersecting arms having a rear surface, said rear surface of each of said arms having a first tab extending away from said rear surface, said first tab extending along a full perimeter of said lens, said rear surface of each of said arms having a second tab extending away from said rear surface, said second tab extending along a full perimeter of said lens, said first tab on each of said arms engaging said first groove in said distal edge of said top wall associated with each of said intersecting members of said frame, said second tab on each of said arms engaging said second groove in said distal edge of said lower wall associated with each of said intersecting members of said frame;

a plurality of light emitters, each of said light emitters being positioned in said frame, each of said light emitters being positioned behind said lens wherein each of said light emitters is configured to emit light through said lens, said plurality of light emitters being spaced apart from each other and being distributed around a full perimeter of said frame, said plurality of light emitters being in electrical communication with each other;

a switch being slidably integrated into said rear wall of a respective one of said intersecting members of said frame, said switch being electrically coupled to said plurality of light emitters, said switch being positionable in an on position for turning said plurality of light emitters on, said switch being positionable in an off position for turning said plurality of light emitters off; and a power supply being integrated into a respective one of said intersecting members of said frame, said power supply being electrically coupled to said switch, said power supply comprising at least one battery.

* * * * *